(12) United States Patent
Pursley et al.

(10) Patent No.: US 7,544,639 B2
(45) Date of Patent: Jun. 9, 2009

(54) COMPOSITION AND PROCESS FOR THE TREATMENT OF HYDROGEN SULFIDE

(75) Inventors: John T. Pursley, Highlands Ranch, CO (US); David L. Holcomb, Golden, CO (US); Glenn S. Penny, Marlow, OK (US)

(73) Assignee: CESt Chemical, Duncan, OK (US)

( * ) Notice: Subject to any disclaimer, the term of this patent is extended or adjusted under 35 U.S.C. 154(b) by 508 days.

(21) Appl. No.: 11/122,681

(22) Filed: May 5, 2005

(65) Prior Publication Data

US 2005/0209107 A1    Sep. 22, 2005

Related U.S. Application Data

(62) Division of application No. 10/377,322, filed on Feb. 28, 2003, now Pat. No. 7,380,606.

(60) Provisional application No. 60/361,438, filed on Mar. 1, 2002.

(51) Int. Cl.
*C09K 8/528* (2006.01)
*B01D 19/04* (2006.01)
*E21B 21/00* (2006.01)

(52) U.S. Cl. ............... 507/263; 95/235; 166/305.1; 166/312; 507/927; 516/72; 516/76

(58) Field of Classification Search ......... 507/263, 507/927; 95/235; 166/305.1, 312; 516/28, 516/29, 30, 72, 76

See application file for complete search history.

(56) References Cited

U.S. PATENT DOCUMENTS

| 3,047,062 | A |   | 7/1962  | Meadors |
| 3,624,019 | A | * | 11/1971 | Anderson et al. ......... 523/336 |
| 3,756,319 | A |   | 9/1973  | Holm et al. |
| 4,511,488 | A |   | 4/1985  | Matta |
| 4,978,512 | A | * | 12/1990 | Dillon ................ 423/226 |
| 5,008,026 | A |   | 4/1991  | Gardner et al. |
| 5,034,140 | A |   | 7/1991  | Gardner et al. |
| 5,083,613 | A |   | 1/1992  | Gregoli et al. |
| 5,247,995 | A |   | 9/1993  | Tjon-Joe-Pin et al. |
| 5,310,002 | A |   | 5/1994  | Blauch et al. |
| 5,356,482 | A | * | 10/1994 | Mehta et al. ............ 134/22.1 |
| 5,587,354 | A |   | 12/1996 | Duncan, Jr. |
| 5,587,357 | A |   | 12/1996 | Rhinesmith |
| 5,665,689 | A |   | 9/1997  | Durbut |
| 5,676,763 | A |   | 10/1997 | Salisbury et al. |
| 5,707,940 | A | * | 1/1998  | Bush et al. ............ 507/138 |
| 5,784,386 | A |   | 7/1998  | Norris |
| 5,811,383 | A |   | 9/1998  | Klier et al. |
| 5,830,831 | A |   | 11/1998 | Chan et al. |
| 5,874,386 | A |   | 2/1999  | Chan et al. |
| 5,996,692 | A |   | 12/1999 | Chan et al. |
| 6,112,814 | A |   | 9/2000  | Chan et al. |
| 6,148,917 | A | * | 11/2000 | Brookey et al. ......... 166/301 |
| 6,165,946 | A |   | 12/2000 | Mueller et al. |
| 6,173,776 | B1 |  | 1/2001  | Furman et al. |
| 6,191,090 | B1 |  | 2/2001  | Mondin et al. |
| 6,228,830 | B1 | * | 5/2001 | Vlasblom ............. 510/365 |
| 6,260,621 | B1 |  | 7/2001  | Furman et al. |
| 6,581,687 | B2 |  | 6/2003  | Collins et al. |
| 6,593,279 | B2 |  | 7/2003  | Von Krosigk et al. |
| 6,911,417 | B2 |  | 6/2005  | Chan et al. |
| 7,231,976 | B2 |  | 6/2007  | Berry et al. |
| 2001/0007663 | A1 | | 7/2001 | Von Corswant |
| 2003/0022944 | A1 | | 1/2003 | Gumkowski et al. |
| 2003/0032562 | A1 | * | 2/2003 | Crossman et al. ........ 507/212 |

FOREIGN PATENT DOCUMENTS

| CA | 2345305 | 4/2000 |
| CA | 2394858 | 6/2001 |
| WO | WO 01/42387 A1 | 6/2001 |

* cited by examiner

*Primary Examiner*—Timothy J Kugel
(74) *Attorney, Agent, or Firm*—Crowe & Dunlevy, P.C.

(57) ABSTRACT

Disclosed is a method for the treatment of hydrogen sulfide. The method preferably includes forming a solvent-surfactant blend, preparing a microemulsion by combining the solvent-surfactant blend with a carrier fluid and contacting the hydrogen sulfide with the microemulsion. In preferred embodiments, the solvent-surfactant blend includes a surfactant and a solvent selected from the group consisting of terpenes and alkyl or aryl esters of short chain alcohols.

8 Claims, No Drawings

US 7,544,639 B2

COMPOSITION AND PROCESS FOR THE TREATMENT OF HYDROGEN SULFIDE

RELATED APPLICATIONS

This present application is a divisional application of U.S. patent application Ser. No. 10/377,322, filed Feb. 28, 2003, entitled "Composition and Process for Well Cleaning," which claims the benefit of U.S. Provisional Patent Application No. 60/361,438 filed Mar. 1, 2002, entitled Composition and Process for Well Cleaning, both of which are hereby incorporated by reference.

FIELD OF THE INVENTION

The present invention generally relates to the production of petroleum products and more particularly to a composition and process for improving the recovery of petroleum products from a subterranean geological formation.

BACKGROUND OF THE INVENTION

For many years, petroleum products have been recovered from subterranean reservoirs through the use of drilled wells and production equipment. During the production of desirable hydrocarbons, such as crude oil and natural gas, a number of other naturally occurring substances may also be encountered within the subterranean environment.

For example, hydrogen sulfide ($H_2S$) is a highly toxic, colorless gas that is produced during the decomposition of organic matter. In some areas, hydrogen sulfide gas is produced in large quantities during the retrieval of petroleum products. At relatively low concentrations (200 ppm) and minimal exposure times, hydrogen sulfide gas can be lethal. In areas prone to the production of hydrogen sulfide, drilling crews must be prepared to use detection and protective equipment at all times. The contamination of well sites from hydrogen sulfide gas is a significant environmental concern that requires extensive remediation. Additionally, during downstream processing, hydrogen sulfide is typically removed from refined products through expensive and waste-extensive procedures. The control and mitigation of hydrogen sulfide is a significant business that is strictly regulated throughout petroleum producing countries.

In addition to hydrogen sulfide, other undesirable downhole products must be managed during the production of hydrocarbons. For example, scale, paraffins, fines, sulfur, heavy oil tar by-products and water blocks commonly accumulate in and around the formation, well casing, production tubing and recovery equipment. Alternatively, it may be necessary to remove injected fluids from the near wellbore area, such as drilling fluids, cement filtrate, kill fluids, polymers and water blocks. To maintain an efficient recovery of petroleum products, it is frequently necessary to clean or remove these accumulations and deposits.

The removal of unwanted deposits from the wellbore and production equipment is generally referred to as "remediation." In contrast, the term "stimulation" generally refers to the treatment of geological formations to improve the recovery of hydrocarbons. Common stimulation techniques include well fracturing and acidizing operations. Well remediation and stimulation are important services that are offered through a variety of techniques by a large number of companies.

Although a number of compounds and techniques are known in the prior art, there is a continued need for more effective methods and compounds for hydrogen sulfide mitigation, wellbore remediation, drilling operations and formation stimulation.

SUMMARY OF THE INVENTION

The present invention includes a method for the treatment of hydrogen sulfide. The method preferably includes forming a solvent-surfactant blend, preparing a microemulsion by combining the solvent-surfactant blend with a carrier fluid and contacting the hydrogen sulfide with the microemulsion. In preferred embodiments, the solvent-surfactant blend includes a surfactant and a solvent selected from the group consisting of terpenes and alkyl or aryl esters of short chain alcohols.

These and various other features and advantages that characterize the present invention will be apparent from a reading of the following detailed description and appended claims.

DETAILED DESCRIPTION OF THE PREFERRED EMBODIMENT

The present invention relates to the preparation and use of a well treatment microemulsion in the management of undesirable downhole products encountered during the production of hydrocarbons from subterranean reservoirs. Unlike prior art cleaning and stimulation fluids, the well treatment microemulsions of the present invention are stablilized microemulsions that are formed by the combination of solvent-surfactant blends with an appropriate oil-based or water-based carrier fluid.

The solvent-surfactant blend generally includes a solvent, a surfactant and an alcohol. In a presently preferred embodiment, the solvent is selected from the group of unsaturated aliphatic cyclic hydrocarbons known as terpenes, including monoterpenes and diterpenes. In a particularly preferred embodiment, the solvent is the monoterpene d-limonene ($C_{10}H_{16}$). Terpenes, such as d-limonene, are preferred for their solvent qualities and biodegradability.

In an alternate embodiment, the terpene-based solvent is replaced with alkyl, cyclic or aryl acid esters of short chain alcohols, such as ethyl lactate and hexyl ester. Ethyl lactate is a low cost, environmentally safe solvent that can be manufactured from carbohydrates, such as cornstarch. Although acceptable for well remediation and stimulation, ethyl lactate is not generally recommended for use in hydrogen sulfide mitigation applications. It will also be understood that combinations of different solvents, such as d-limonene and ethyl lactate, are also encompassed within the scope of the present invention.

The selection of the surfactant component for the solvent-surfactant blend is determined by the type of carrier fluid selected. Water-based carrier fluids, such as fresh water and brine, are typically more environmentally friendly and cost effective. Oil-based carrier fluids, such as diesel, kerosene and jet fuel may provide enhanced performance but are generally more expensive and environmentally restricted.

If a water-based carrier fluid is chosen, the surfactant of the solvent-surfactant blend should be capable of creating an oil-in-water microemulsion upon combination with an appropriate quantity of water. Preferred surfactants are biodegradable and have an HLB (hydrophile-lipophile balance) value of between about 8-18. Presently preferred oil-in-water surfactants include one or more of the following: tween 40 (polyoxyethylene sorbitan monopalmitate), tween 60 (polyoxyethylene sorbitan monostearate), tween 80 (polyoxyethylene sorbitan monooleate), linear alcohol alcoxylates, alkyl ether sulfates, dodecylbenzene sulfonic acid (DDBSA), linear nonyl-phenols, dioxane, ethylene oxide and ethoxylated castor oils such as PEG castor oil. A preferred oil-in-water surfactant mixture includes polyoxyethylene sorbitan monopalmitate, ethoxylated castor oil and polyethylene glycol.

Alternately preferred oil-in-water surfactants can also include dipalmitoyl-phosphatidylcholine (DPPC), sodium 4-(1' heptylnonyl) benzenesulfonate (SHPS or SHBS), polyoxyethylene(8.6) nonyl phenyl ether, aerosol O.T. (sodium bis-2-ethylhexylsulphosuccinate), A.O.T., tetraethyleneglycoldodecylether, sodium octlylbenzenesulfonate, O.B.S., SCS, IsalChem 145 (PO), sodium ether surfactant, E.O. sulonates (i.e., alkyl propoxy-ethoxysulfonate), alkyl propoxy-ethoxysulfate, alkylaryl-propoxy-ethoxysulfonate and highly substituted benzene sulfonates (n-C12-oxylene-SO3—).

If an oil-based carrier fluid is chosen, the surfactant of the solvent-surfactant blend should be capable of creating a water-in-oil microemulsion upon combination with oil. Preferred surfactants are biodegradable and have an HLB value of between about 3-8. Presently preferred water-in-oil surfactants include span 40 (sorbitan monopalmitate), span 60 (sorbitan monostearate) and span 80 (sorbitan monooleate). A preferred water-in-oil surfactant mixture includes sorbitan monopalmitate, ethoxylated castor oil and polyethylene glycol.

The alcohol component of the solvent-surfactant blend serves as a coupling agent between the solvent and the surfactant, thereby stabilizing the microemulsion. The alcohol also lowers the freezing point of the well treatment microemulsion. Although isopropanol is presently preferred, alternative suitable alcohols include midrange primary, secondary and tertiary alcohols with between 1 and 20 carbon atoms, such as t-butanol, n-butanol, n-pentanol, n-hexanol and 2-ethyl-hexanol. Other freeze prevention additives can additionally or alternatively be added, such as detergent range alcohols ethoxylate, ethylene glycols (EG), polyethylene glycols (PEG), propylene glycols (PG) and triethylene glycols (TEG), with triethylene glycol being presently preferred.

The solvent-surfactant blend optionally includes a salt. The addition of a salt to the solvent-surfactant blend reduces the amount of water needed as a carrier fluid and also lowers the freezing point of the well treatment microemulsion. Among the salts that may be added for stability and co-solvent substitution, NaCl, KCl, $CaCl_2$, and MgCl are presently preferred. Others suitable salts can be formed from K, Na, Br, Cr, Cs and Bi families.

After blending the solvents, surfactants and alcohols, it may be desirable to form a diluted solvent-surfactant blend by adding a diluent before addition to the carrier fluid. Presently preferred diluents include water and water and triethylene glycol (TEG) mixtures. A particularly preferred diluent is 90% by volume water and 10% by volume triethylene glycol. It will be understood that upon addition of the diluent, the solvent surfactant blend may partially or completely emulsify.

For oil-in-water well treatment microemulsions, the solvent-surfactant blend preferably includes about 36%-76% by volume of the preferred oil-in-water surfactant mixture (polyoxyethylene sorbitan monopalmitate, ethoxylated castor oil and polyethylene glycol), about 14%-54% by volume d-limonene and/or ethyl lactate and about 0%-10% isopropanol by volume. In a particularly preferred embodiment, the oil-in-water solvent-surfactant blend includes about 56% by volume of the preferred oil-in-water surfactant mixture, about 34% by volume d-limonene, ethyl lactate or combinations thereof, and about 10% by volume isopropanol.

In an alternatively preferred embodiment, the oil-in-water solvent-surfactant blend is diluted with about 50% by volume of diluent. The diluted solvent-surfactant blend preferably includes water and more preferably includes about 45% by volume water and about 5% by volume triethylene glycol. Accordingly, the diluted solvent-surfactant blend includes about 27% by volume of the preferred oil-in-water surfactant mixture, about 34% by volume d-limonene, about 5% by volume isopropanol, about 45% by volume water and about 5% by volume triethylene glycol.

For water-in-oil well treatment microemulsions, the solvent-surfactant blend preferably includes about 36%-76% by volume of the preferred water-in-oil surfactant mixture (sorbitan monopalmitate, ethoxylated castor oil and polyethylene glycol), about 14%-54% by volume d-limonene and/or ethyl lactate and about 0%-10% isopropanol by volume. In a particularly preferred embodiment, the water-in-oil solvent-surfactant blend includes about 56% by volume of the preferred water-in-oil surfactant mixture, about 34% by volume d-limonene, ethyl lactate or a combination of d-limonene and ethyl lactate, and about 10% by volume isopropanol. The water-in-oil solvent-surfactant blend forms a microemulsion upon combination with diesel or kerosene to form a preferred water-in-oil well treatment microemulsion.

In an alternatively preferred embodiment, the water-in-oil solvent-surfactant blend is combined with about 0%-20% by volume of a diluent prior to adding the carrier fluid to form a diluted water-in-oil solvent-surfactant blend. More preferably, about 5% by volume of diluent is added to the water-in-oil solvent-surfactant blend. The diluent can include water and more preferably includes about 45% by volume water and about 5% by volume triethylene glycol. It will be understood that upon addition of the diluent, the water-in-oil solvent-surfactant blend may partially or completely emulsify.

The solvent-surfactant blends, dilute or concentrated, can be added to the water and oil-based carrier fluids in sparing amounts to prepare the desired well treatment microemulsions. For example, in many applications, as little as 0.2%-2% by volume of solvent-surfactant blend in water or oil based-carrier fluids will be sufficient. In other applications, however, it may be desirable to use a more concentrated well treatment microemulsion. In such applications, the well treatment microemulsion preferably includes about 0.5% to about 90% of the selected solvent-surfactant blend. Furthermore, it will be understood that in some applications, it may be desirable to apply the solvent-surfactant blend, diluted or concentrated, without the addition of a carrier fluid. For example, the solvent-surfactant blend can be pumped downhole where it will incorporate water and water-based materials to form the microemulsion in situ. Once formed, the well treatment microemulsion can be pumped from the wellbore to the surface.

Although for the purposes of the present disclosure preferred embodiments of the well treatment microemulsions are described in connection with well remediation, stimulation, acidizing operations, drilling operations and hydrogen sulfide mitigation applications, it will be understood that the inventive well treatment microemulsions can be used in additional, alternative applications. For example, it is contemplated that the well treatment microemulsion could also be used to clean surface equipment and downhole equipment.

In well remediation applications, the selected well treatment microemulsion is preferably injected directly into the wellbore through the production tubing or through the use of coiled tubing or similar delivery mechanisms. Once downhole, the well treatment microemulsion remedies drilling damage, fracturing fluid damage, water blocks and removes fines, asphaltenes and paraffins from the formation and wellbore. The well treatment microemulsion also serves to thin heavy hydrocarbons, alleviate water blocks and lower pore pressure in the formation. If paraffin accumulation is significant, ethyl lactate or ethyl lactate and d-limonene mixtures are preferred as solvents.

During drilling operations, the well treatment microemulsions can be added to drilling fluids and injected into the wellbore through the drill string. The well treatment microemulsion is effective at removing fines and debris from the wellbore created by the drilling process. The surfactant used in the solvent-surfactant blend should be selected according to whether oil or water based drilling fluids are used.

The inventive well treatment microemulsions can also be used in stimulation operations. In fracturing operations, proppant material can be added to the microemulsion before injection downhole. The microemulsion is particularly effective at decreasing the density of filter cakes during high pressure injection of gelled fluids into the wellbore.

The well treatment microemulsions can also be used to deliver acids during acidizing operations. Acids commonly used include hydrochloric, acetic, formic, and hydrochloric-hydroflouric acids. In a presently preferred embodiment, the selected solvent-surfactant blend (dilute or concentrate) is combined with an acidified carrier fluid to prepare a microemulsion suitable for acidizing operations. Preferably, the microemulsion includes about 0.2%-5% by volume of the solvent-surfactant blend and about 3%-28% by volume of acid. In a particularly preferred embodiment, the microemulsion includes about 0.2%-5% of the solvent-surfactant blend and about 15% by volume of hydrochloric acid. The concentration of the well treatment microemulsion in gelled fluids lowers the friction created by contact with conduits, thereby facilitating the injection and withdrawal of the well treatment microemulsion.

As mentioned above, the inventive microemulsions can also be used for hydrogen sulfide mitigation. In preferred embodiments, the well treatment microemulsions are injected into the wellbore so that escaping hydrogen sulfide gas is "stripped" through the well treatment microemulsions. Preferably, the inventive microemulsion is periodically injected into problem wells to mitigate hydrogen sulfide production. Alternatively, the microemulsion can be injected downhole via capillary tubing on a continuous basis. In yet another alternate embodiment, the well treatment microemulsion can be placed in a container that is placed in fluid communication with the hydrogen sulfide.

In a preferred embodiment, some or all of the water or oil-based carrier fluid is replaced with a known hydrogen sulfide scavenger. For example, many cyclic amines, such as triazines and hexamines, can be used as a solvent alone or in combination with water or oil-based carrier fluids to further improve hydrogen sulfide mitigation.

The interaction between the well treatment microemulsions and the hydrogen sulfide neutralizes the hydrogen sulfide, leaving an inert sulfur compound as a product of the reaction. Significantly, benzothiophenes are also produced as a by-product of the reaction between the hydrogen sulfide and the well treatment microemulsions. Pharmaceutical researchers have recently discovered that benzothiophenes can be used as an intermediate in the synthesis of a number of useful chemical compounds.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and as defined in the written description and appended claims.

It is claimed:

1. A method for the treatment of hydrogen sulfide; comprising:
    forming a solvent-surfactant blend;
    preparing a microemulsion by combining the solvent-surfactant blend with a carrier fluid, wherein the microemulsion does not contain a hydrogen sulfide scavenger; and
    treating the hydrogen sulfide by injecting the microemulsion into a wellbore and contacting the hydrogen sulfide with the microemulsion.

2. The method of claim 1, wherein the step of forming the solvent-surfactant blend comprises:
    combining a solvent with a surfactant, wherein the solvent is selected from the group consisting of terpenes.

3. The method of claim 2, wherein the step of forming the solvent-surfactant blend comprises:
    combining a solvent with a surfactant, wherein the solvent is d-limonene.

4. The method of claim 1, wherein the step of treating the hydrogen sulfide with the microemulsion into a wellbore and contacting the hydrogen sulfide with the microemulsion comprises:
    placing the microemulsion in a container in fluid communication with a source of hydrogen sulfide.

5. The method of claim 1, wherein the carrier fluid is water-based and the step of forming the solvent-surfactant blend comprises:
    combining a solvent and a surfactant, wherein the surfactant has a hydrophile-lipophile balance value of between 8-18.

6. The method of claim 1, wherein the carrier fluid is water-based and the step of forming the solvent-surfactant blend comprises:
    combining a solvent and a surfactant, wherein the surfactant is an oil-in-water surfactant mix mixture that includes polyoxyethylene sorbitan monopalmitate, ethoxylated castor oil and polyethylene glycol.

7. The method of claim 1, wherein the carrier fluid is oil-based and the step of forming the solvent-surfactant blend comprises:
    combining a solvent and a surfactant, wherein the surfactant has a hydrophile-lipophile balance value of between 3-8.

8. The method of claim 1, wherein the carrier fluid is oil-based and the step of forming the solvent-surfactant blend comprises:
    combining a solvent and a surfactant, wherein the surfactant is an oil-based surfactant mixture that includes sorbitan monopalmitate, ethoxylated castor oil and polyethylene glycol.

* * * * *

UNITED STATES PATENT AND TRADEMARK OFFICE
CERTIFICATE OF CORRECTION

| | | |
|---|---|---|
| PATENT NO. | : 7,544,639 B2 | Page 1 of 1 |
| APPLICATION NO. | : 11/122681 | |
| DATED | : June 9, 2009 | |
| INVENTOR(S) | : John T. Pursley et al. | |

It is certified that error appears in the above-identified patent and that said Letters Patent is hereby corrected as shown below:

Title Page, Item (73) Assignee:
The Assignee name should be "CESI Chemical, A Flotek Company."

Signed and Sealed this
Fourth Day of September, 2012

David J. Kappos
*Director of the United States Patent and Trademark Office*